March 17, 1970     L. S. COX ET AL     3,500,489
AUTOMATIC DRINKING GLASS WASHER
Filed June 20, 1967     5 Sheets-Sheet 1
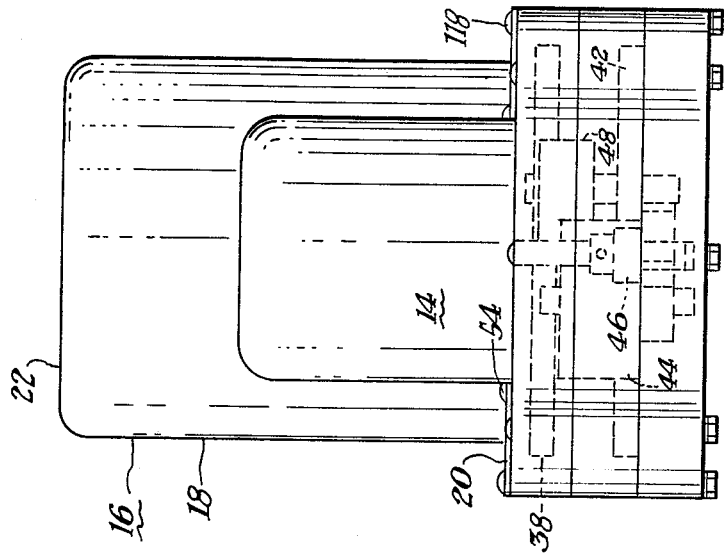
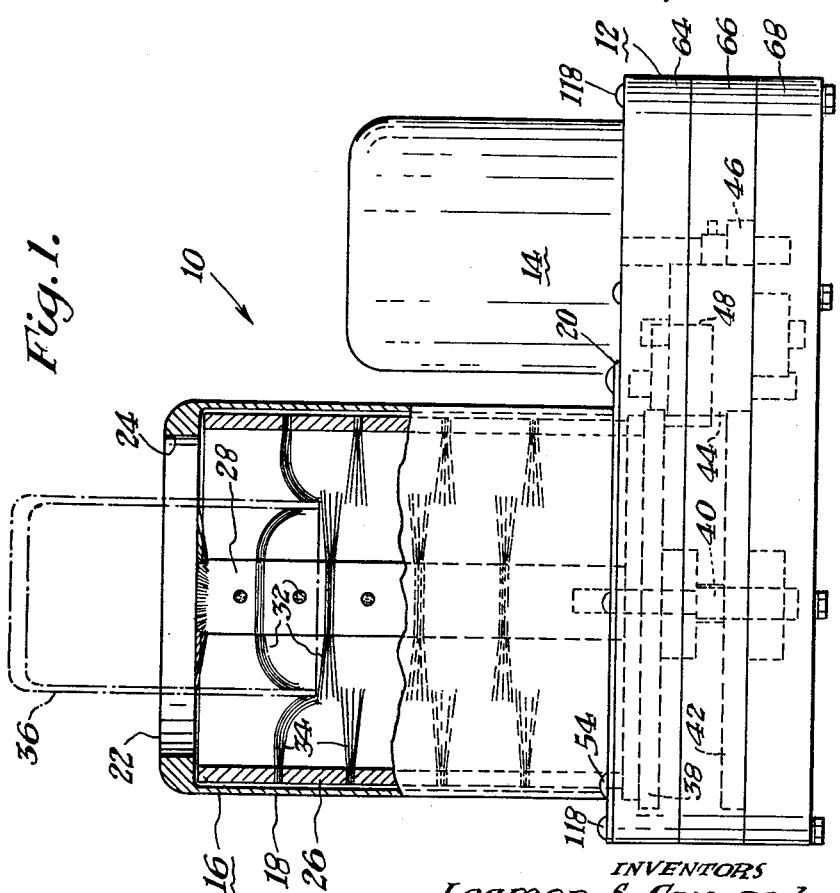
INVENTORS
Leamon S. Cox and
Winfield D. Gibbs.
BY
THEIR ATTORNEYS March 17, 1970     L. S. COX ET AL     3,500,489
AUTOMATIC DRINKING GLASS WASHER Filed June 20, 1967     5 Sheets-Sheet 3

INVENTORS
Leamon S. Cox and
Winfield D. Gibbs.
BY
THEIR ATTORNEYS

March 17, 1970 L. S. COX ET AL 3,500,489
AUTOMATIC DRINKING GLASS WASHER
Filed June 20, 1967 5 Sheets-Sheet 4

INVENTORS
Leamon S. Cox and
Winfield D. Gibbs.
BY
THEIR ATTORNEYS

March 17, 1970 L. S. COX ET AL 3,500,489
AUTOMATIC DRINKING GLASS WASHER
Filed June 20, 1967 5 Sheets-Sheet 5
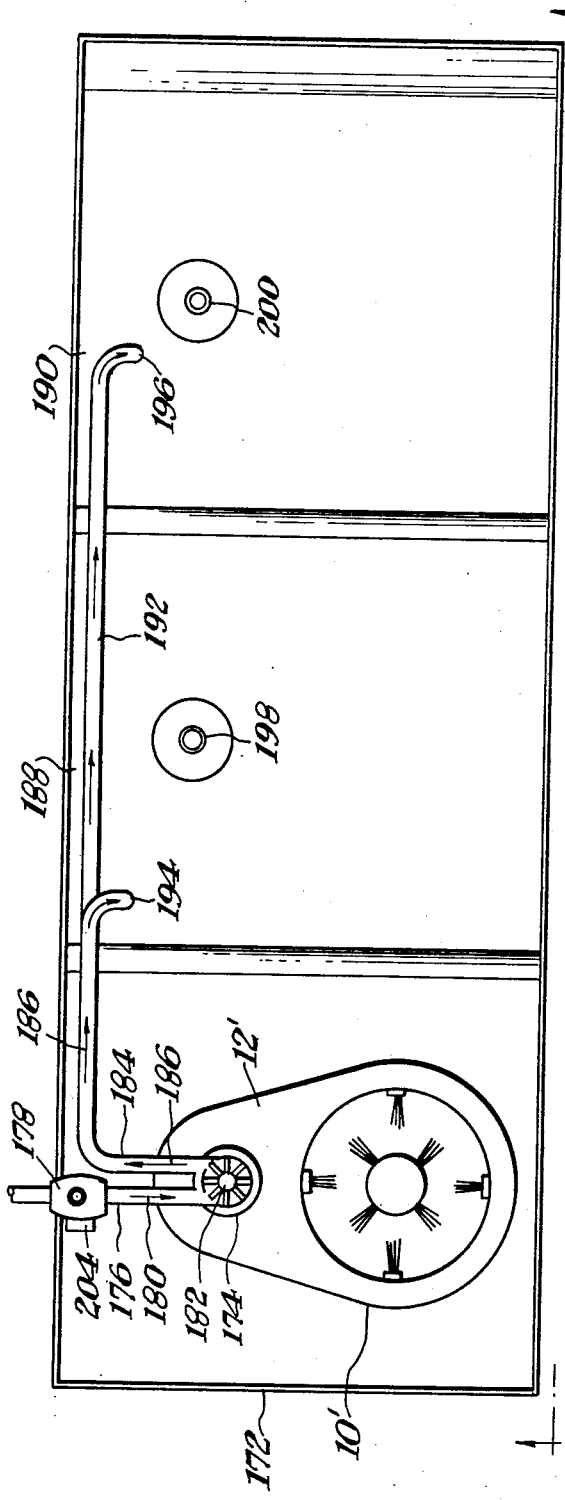
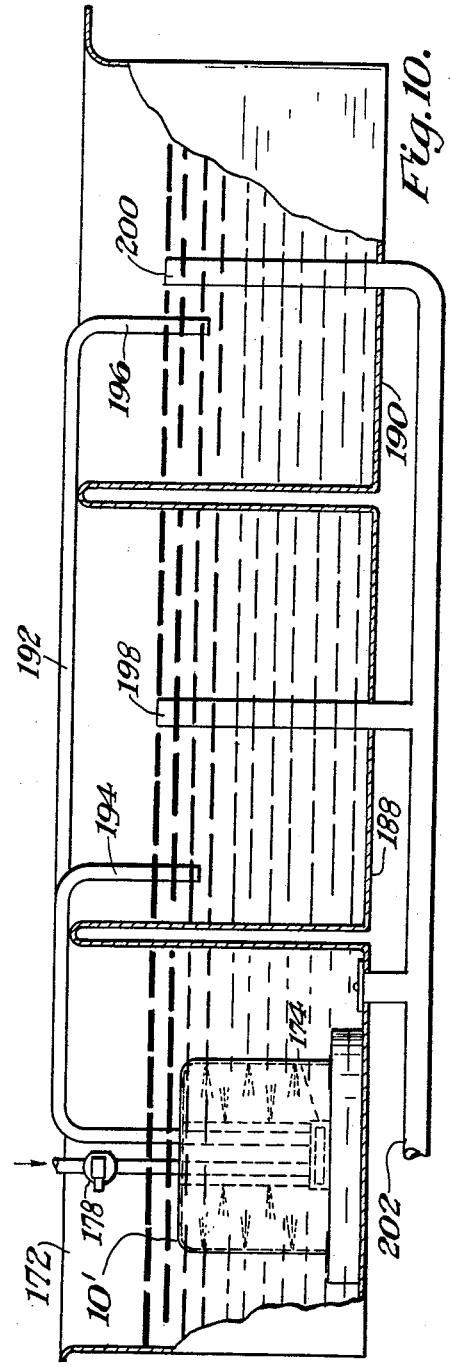
INVENTORS
Leamon S. Cox and
Winfield D. Gibbs
BY
THEIR ATTORNEYS 3,500,489
AUTOMATIC DRINKING GLASS WASHER
Leamon S. Cox, 5064 Brownsville Road, Pittsburgh, Pa. 15236; and Winfield D. Gibbs, Box 594, Warner Road, Vienna, Ohio 44473
Filed June 20, 1967, Ser. No. 647,381
Int. Cl. B67c 1/04, 1/08
U.S. Cl. 15—76        11 Claims

ABSTRACT OF THE DISCLOSURE

Novel washing apparatus is disclosed which is capable of complete immersion in a sink or other washing tank. The moving parts of the apparatus are arranged for water lubrication and are encapsulated in a novel base structure. In furtherance of this purpose the base structure is made up of a number of layers having gearing recesses, hub wells, bearing recesses and through aperatures appropriately positioned to enclose a gearing train of the apparatus and to beamingly engage the shafts and/or hubs associated therewith. Contrarotated brushes are mounted respectively on output gears. An outer or drum brush is extended through an opening in one of the layers and mounted on one of the output gears for rotation therewith. A shaft of the other output gear extends through said one output gear and is threadedly engaged with a central or cylinder brush juxtaposed to the drum brush. A stationary shield for the scrubbing head is mounted on the top base layer and includes a retaining lip for the drum brush. Another arrangement of the apparatus includes double brush heads and a second pair of output gears. The washing apparatus can be powered by a submersible electric motor or by a fluid motor. If the latter be employed, a novel arrangement for recirculating exhaust water thereof through one or more tanks can be used.

---

The present invention relates to automatic washing apparatus for drinking glasses and similar articles and more particularly to apparatus of the character described which can be completely submerged in the cleaning solution employed with the apparatus.

Although our invention is primarily described in connection with drinking glasses, it will be obvious that the washing apparatus can be readily modified to accommodate other articles.

There have been many forms of motor driven drinking glass washers and the like proposed heretofore. For the most part, prior washers have either included a self-contained tank of quickly contaminated washing solution or have not been completely submersible in a larger tank of cleaning or washing solution. As a result, prior drinking glass washers have been difficult to manipulate and have not been able to accomplish the pre-requisite, thorough cleaning operation. In the case of those washers employing a self-contained cleaning solution, the solution not being readily changeable has been permitted to remain in the cleaner for an extended period by kitchen or bar personnel. As a result the cleaning of the glassware or other articles has been further impaired.

Prior glass washers and the like in addition have employed brush structures which provided the greatest washing action to the interior surfaces of the glassware, with the result that exterior surfaces of the glassware were not properly cleaned. However, the spread of communicable disease by such glassware, particularly in restaurants, and other public eating places is accomplished almost entirely by human contact with the exterior surfaces of the glassware. Accordingly, a thorough cleaning of the outer glassware surfaces must be the more important function of an acceptable glassware washer.

In those prior drinking glass washers which are partially submersible rapid wear of their moving parts results from the corrosive contact with the water, the difficulty of lubricating moving parts, or the rapid wear of grease and/or water seals and the like. As a result previously proposed glassware washers, particularly of the partially submersible variety have not met with market acceptability owing to the rapid wearing characteristics thereof. By the same token those glass washers employing self-contained cleaning solution are subject to analogous technical difficulties in connection with extension of drive shafts or the like for the brushes through the cleaning solution tank. Here again the corrosion occasioned by the cleaning detergents and by the water itself rapidly deteriorates the grease or water seal at the junction of the tank and the rotating shaft.

We overcome these difficulties of the prior art by providing a compact, completely submersible automatic washer for drinking glasses and the like. The various moving parts of our novel washing apparatus are intended for water lubrication and are constructed from materials which are immune to corrosion by water and detergents. Moreover, our novel washing apparatus is capable of washing one or more item of glassware or the like simultaneously. The brushes of our washer are desirably contrarotated and include a cylindrical brush or equivalent for washing the interior of the glassware and a drum type brush or equivalent for washing the exterior. With this arrangement all surfaces of the glassware are throughly cleaned.

We contemplate driving our washing apparatus by means of a submersible electric motor or the like, or by a fluid motor so that the entire washing apparatus can be submersed in a container of any suitable size or in the basin of a conventional sink provided in restaurants, kitchens or bars. Thus, our compact washing apparatus does not require any additional space and is particularly adaptable for operation in a sink or the like usually provided beneath a serving bar where space is usually at a premium. Moreover, our washing apparatus can be easily manipulated by the bartender or other serving personnel with the result that drinking glasses or the like can be more thoroughly and quickly cleaned than was the case with conventional apparatus.

When our novel washing apparatus is powered by a fluid motor, for example, the fluid motor desirably is arranged to operate with minimal tap water pressures of 20 p.s.i. or over. Accordingly, this form of our novel washing apparatus can be operated in any locality having city water or in those localities having private water supplies such as a deep well pump or the like which is usually subject to the operating limits of 20 and 40 p.s.i.

It is also contemplated that the outlet of the fluid motor, when provided and when operated by tap water or other fresh water supply, can be coupled to one or more rinse tanks or basins inasmuch as the water is not soiled or contaminated by passage through the fluid motor. Thus, a continuous circulation of water in the one or more rinse tanks is advantageously provided.

We accomplish these desirable results, in the simplest form of our novel washing apparatus, by providing washing apparatus comprising a base structure, drive means mounted on the base structure, at least one driven member mounted in said base structure in driven relationship with said drive means, said driven member being rotatably mounted in said base structure adjacent a substantially co-extensive opening in an outer surface of said base structure, and a scrubbing head having its lower portion extending through said opening and at least partially mounted on said driven member.

In a more sophisticated form, said scrubbing head is keyingly engaged with said driven member for rotation therewith, and a generally tubular shield member is mounted on said outer surface and partially surrounding said scrubbing head, said shield having a retaining lip juxtaposed to the other end of said scrubbing head to prevent separation thereof from said driven member, said lip defining an admission opening for items to be cleaned by said scrubbing head.

In a specific application, a second driven member is rotatably mounted on said base structure at a location relatively more remote from said scrubbing head than from said first mentioned driven member, said second driven member being in driven relationship with said driving means and having a shaft secured thereto for rotation therewith and extending through an aperture in said first-mentioned driven member, and said scrubbing head having an outer drum brush mounted on said first-mentioned driven member and an inner generally cylindrical brush mounted on said second driven member shaft for rotation therewith.

We also provide unique means for mounting moving parts of our novel washing apparatus, for example, said driven member is substantially enclosed within said opening and said output gear is provided with a hub at least a portion of which is bearingly and rotatably mounted in a hub well therefor formed in said base structure adjacently and co-axially of said opening. Other moving parts are similarly mounted.

To facilitate assembly of the last-mentioned example of our washing apparatus, said base structure is formed from a plurality of relatively thick layers having said opening, said recess and said hub wells suitably positioned therein to accommodate said driven members and their hubs.

During the foregoing discussion various objects, features and advantages of the invention have been alluded to. These and other objects, features and advantages of the invention together with structural details thereof will be elaborated upon during the forthcoming descritpion of presently preferred embodiments of the invention and presently preferred methods of practicing the same.

In the accompanying drawings we have shown presently preferred embodiments of the invention and have illustrated certain presently preferred methods of practicing the same, wherein:

FIGURE 1 is a side elevational view of one form of washing apparatus arranged in accordance with our invention;

FIGURE 3 is a front elevational view of apparatus as shown in FIGURE 1;

FIGURE 10 is a front elevational view, with parts broken away and other parts sectioned, of still another form of our novel washing apparatus illustrating the use of a fluid motor and recirculating rinse tanks; and FIGURE 11 is a top plan view of the apparatus as shown in FIGURE 10.

Figure 2:
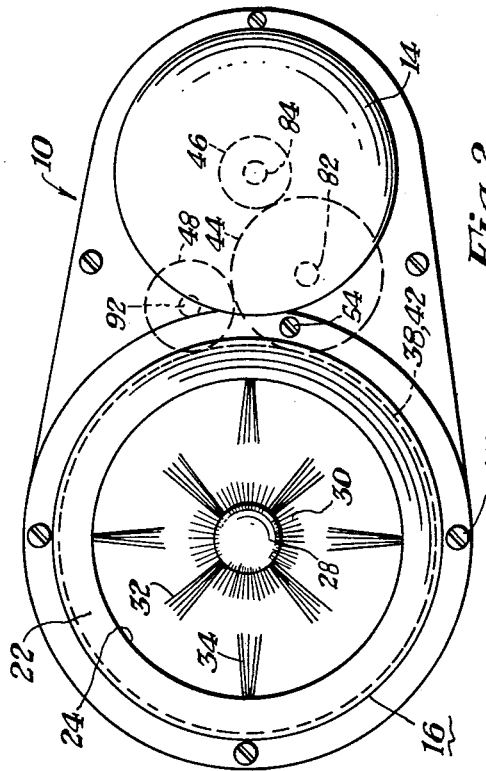
FIGURE 2 is a top plan view of the apparatus as shown in FIGURE 1.

Referring now more particularly to FIGURES 1–7 of the drawings and initially to FIGURES 1–3 an exemplary washing apparatus 10 is illustrated therein in accordance with our invention. The washer 10 comprises a base and gear housing 12 (of unique construction and described hereinafter with reference to FIGURES 4–7), a submersible electric motor 14 or the like mounted on the base 12, and a washing or scrubbing head 16. The washing head in this example includes a generally cylindrical shield 18 having a mounting flange 20 at its lower end and a protective lip 22 at its upper end defining a glassware entrance opening 24. The motor is mounted on about the same elevation (FIGURE 1) as that of scrubbing head 16. Thus, both the motor 14 and the transmission coupling the motor and the scrubbing head 16 are submersible.

Figure 5:
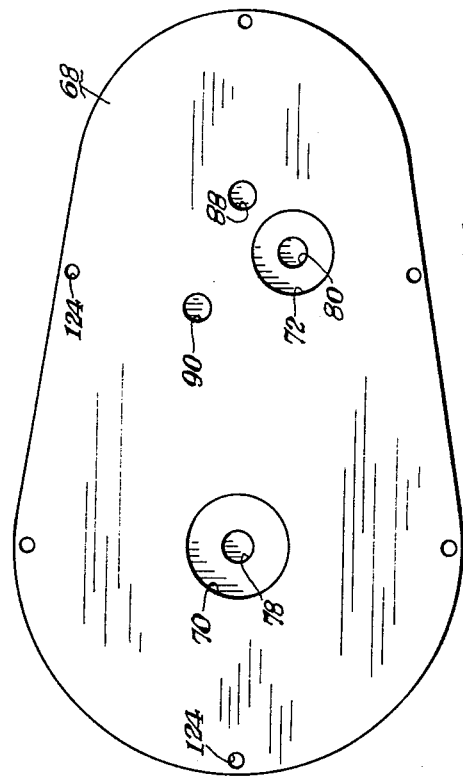
FIGURE 5 is a top plan view of the lowermost base section or layer shown in FIGURE 4 and taken along reference line V—V thereof.
Figure 7:
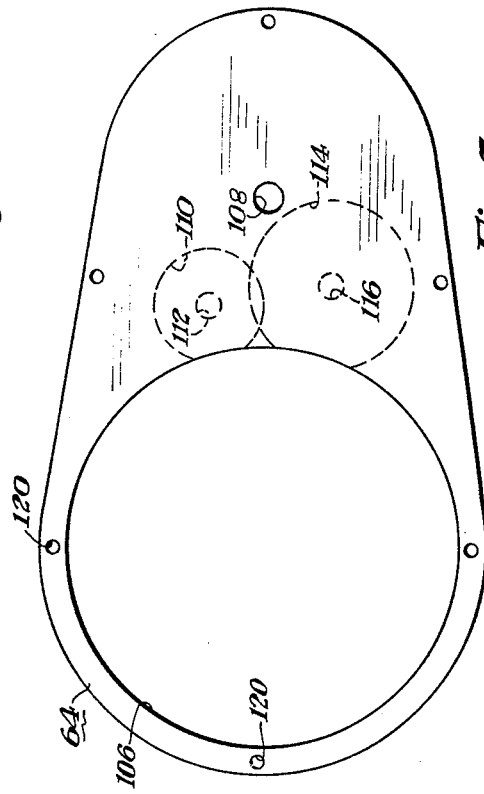
FIGURE 7 is a top plan view of the uppermost base section shown in FIGURE 4 and taken along reference line VII—VII thereof.
Figure 6:
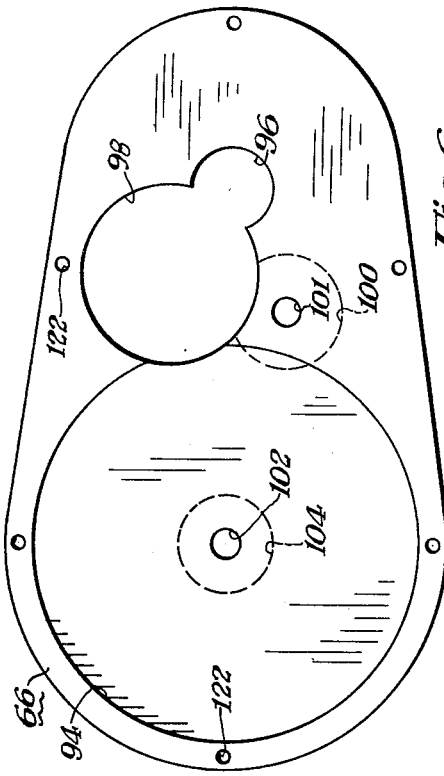
FIGURE 6 is a bottom plan view of the intermediate base section as shown in FIGURE 4 and taken along reference line VI—VI thereof.

An outer or drum type brush 26 is rotatably mounted upon the base structure 12, as described hereinafter with reference to FIGURES 4 and 7, and a central or cylindrical brush 28 likewise is rotatably mounted on the base structure 12, as described below with reference to FIGURES 4, 5 and 6.

Desirably, a central brush 28 includes inner bottom scrubbing bristles 30 and a plurality of rows of inner wall scrubbing bristles 32. On the other hand the drum brush 26 includes a plurality of vertically spaced horizontal rows 34 of outer wall scrubbing bristles. Desirably, the central brush bristles 32 horizontally overlap the drum brush bristles 34 so that when a drinking glass 36 or the like is pushed down between the rows of bristles 34 and 32 the bristles are bent to increase the scrubbing force as the inner and outer brushes 28 and 26 are contrarotated.

As shown in FIGURES 2 and 3, contrarotation of the outer and inner brushes 26, 28 is accomplished according to one arrangement of our invention by a gearing train outlined in the drawings. For example, the outer or drum brush 26 is mounted on top of gear 38 (as viewed in FIGURES 1, 3, and 4) for rotation therewith while inner or cylindrical brush 28 is threadedly connected to shaft 40 of lower output gear 42 for rotation therewith. The lower output gear 42 is rotated through wide faced idler gear 44 and pinion 46 which in turn is driven by motor 14. The upper output gear 38 is likewise driven by the gears 44, 46 and also by a second wide faced idler or reversal gear 48 enmeshed with idler gear 44 and the upper output gear 38. In this arrangement the gearing train 38–48 consists of external spur gears, although of course other types of gears, such as left and right helical gears, can be utilized.

Figure 4:
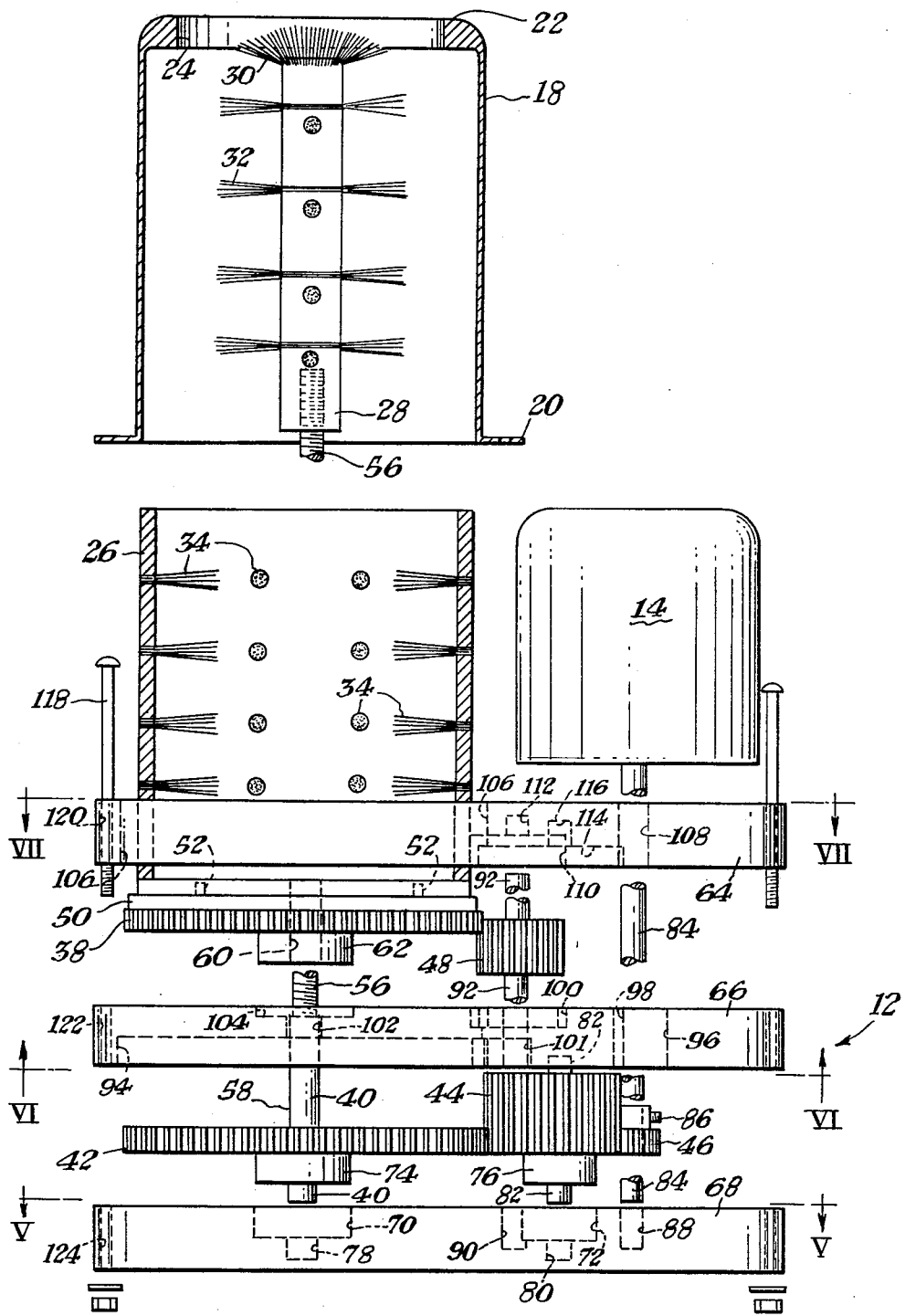
FIGURE 4 is an exploded elevational view of our novel washing apparatus as shown in the preceding figures.

As better shown in FIGURE 4 drum brush 26 is mounted on upper gear plate 50 upon which it is keyed for rotation therewith by suitable keying means, for example pins 52. When thus mounted the drum brush 26 is retained against disengagement from the pins 52 or other keying means by protective lip 22 of the stationary shield 16 as better shown in FIGURE 1. The shield 16 can be bolted or screwed to the base structure 12 by suitable means such as self-tapping or threading screws 54.

On the other hand, the lower output gear 42 is provided with the aforementioned shaft 40 having threaded portion 56. When the base structure 12 is assembled the shank portion 58 of gear shaft 40 extends through aperture 60 of the upper output gear 38 for threaded insertion into the lower end of the inner brush 28. If desired, the upper gear aperture 60 can be sized for close fitting but rotational engagement relative to the lower output gear shaft portion 58 and the upper gear can be rotatably mounted thereon. Alternatively hub 62 of the upper output gear 38 can be rotatably mounted by means described hereinafter.

With the arrangement described thus far, it will be apparent the inner and outer brushes 26, 28 can be readily disassembled and removed from the washing apparatus 10 to facilitate maintenance, replacement and cleaning thereof.

As better shown in FIGURES 4–7 of the drawings the base structure 12 in this arrangement is comprised of an upper layer 64 intermediate layer 66 and bottom layer 68. The bottom layer is provided with recesses or hub wells 70 and 72 as better shown in FIGURE 5 in which lower output gear hub 74 and idler gear hub 76 are rotatably and bearingly mounted. A central recess 78 or 80 can be provided in each of the hub wells 70 or 72 to accommodate projecting ends of lower output gear shaft 40 or idler gear shaft 82. Further, it is contemplated that motor output shaft 84 can project through pinion 46 to which it is secured by set screw 86 for rotatable insertion into shaft bearing recess 88 of the bottom layer 68. When thus assembled the projection of the lower end of motor shaft 84 into the shaft recess 88 minimizes the bending forces on the shaft 84 and also any tendency thereof to whip. A similar shaft recess 90 is provided for the lower projecting end of the reversal idler gear shaft 92 described hereinafter.

When the base structure is assembled as shown in FIGURE 1, the underside of the intermediate base layer 66 is provided with a lower output gear recess 94 which is slightly larger than the lower output gear 42 so as to enclose the latter output gear between the intermediate and base layer 66, 68 when the lower output gear hub 74 is inserted into the hub well 70. The intermediate base layer 66 is also provided with through aperture 96 through which pinion 46 can be inserted with clearance. A second, larger through aperture 98 is provided in the intermediate base layer 66 through which the wide face idler gear 44 is inserted with clearance for engagement with both pinion 46 and with reversal idler gear 48 seated in recess 100 therefor on the upper side of intermediate layer 66. The recess 100 also communicates with through aperture 98 to permit enmeshment of idler gear 44 and pinion 46.

A through aperture 101 extends through middle layer 66 and substantially co-axially with reversal idler gear recess 100 to accommodate its shaft 92 which passes through middle layer 66 for bearing engagement in shaft recess 90 of bottom layer 68.

The intermediate layer 66 is also provided with a third through aperture 102 to accommodate shaft 40 of lower output gear 42. Through aperture 102 thus is aligned with aperture 60 extending through the upper output gear 38. Desirably, a second recess 104 is provided on the upper surface of intermediate layer 66 generally co-axially of shaft aperture 102 to rotatably accommodate the lower end portion of upper output gear hub 62.

The remainder of the upper output gear 38 is accommodated, except for the aforementioned lower hub portion, within a relatively large through aperture 106 of the upper layer 64. Aperture 106 also permits engagement between outer or drum brush 26 and the upper side of its output gear 38. The upper layer 64 is provided with a second, much smaller through aperture 108 to accommodate the passage of motor output shaft 84. Desirably, motor shaft aperture 108 is sized so that the motor shaft 84 fits loosely therewithin while motor shaft aperture 88 in the bottom layer 68 relatively closely and beamingly engages the lower end of the motor shaft 84 to provide the aforementioned auxiliary bearing.

The undersurface of the upper layer 64 additionally is provided with gear recess 110 communicating with upper output gear aperture 106 to permit enmeshment between reversal idler gear 48 and upper output gear 38. Gear recess 110 also includes a shaft bearing recess 112 to provide a bearing for the upper end of reversal idler gear shaft 92, with shaft recess 90 of bottom layer 68 providing the other bearing for shaft 92 as mentioned previously.

The undersurface of upper layer 64 is provided with a second, larger diameter, but shallower gear recess 114 to accommodate the upper portion of idler gear 44. Gear recess 114 communicates with reversal gear recess 110 to permit enmeshment between idler gear 44 and reversal idler gear 48. The larger idler gear recess 114 likewise is provided with shaft bearing recess 116 centrally therein to accommodate the upper end portion of idler gear shaft 82, the lower end of which is likewise bearingly mounted in shaft recess 80 of bottom layer 68.

In fabricating our novel washing apparatus it is contemplated that the elements of gearing train 38–48 can be fabricatetd from nylon, Teflon or other suitable bearing or structural material, which is not corroded by water or detergents. On the other hand, the base layers 64–68 can be fabricated from a relatively harder plastic material or from a metallic bearing material such as bronze or brass to provide suitable bearing surfaces at the aforementioned hub wells 70, 72, 104 and at the aforementioned shaft recess 78, 80, 88, 90, 112, 116 to provide suitable bearing surfaces in these areas. Alternatively, inserts of bearing material (not shown) can be mounted in the upper layer 64 and the bottom layer 68 at locations corresponding to the aforementioned hub wells and shaft recesses.

The aforementioned gearing train 38–48 and their respective bearing points in the upper and base layer 64, 68 are intended for water lubrication particularly when manufactured from the aforementioned bearing materials. Accordingly, there is no attempt to prevent water from flowing through the base structure 12. However, the various recesses, wells and apertures of the base layer 64–68 are sized such that when the base structure is assembled with the gearing train 38–48 in place the base layers 64–68 seat flushly one upon the other as shown in FIGURE 1. When thus positioned the layers 64–68 can be retained together by a plurality of elongated mounting bolts 118 inserted through apertures 120, 122 and 124 in base layers 64–68 respectively.

Figure 9:
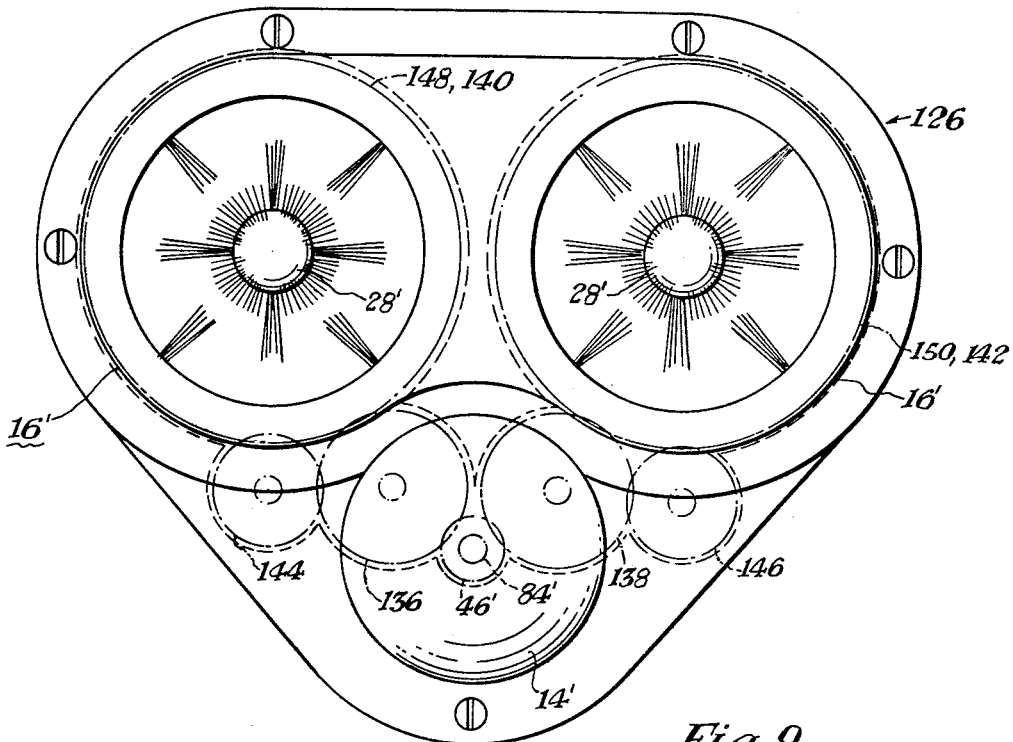
FIGURE 9 is a top plan view of the apparatus as shown in FIGURE 8.
Figure 8:
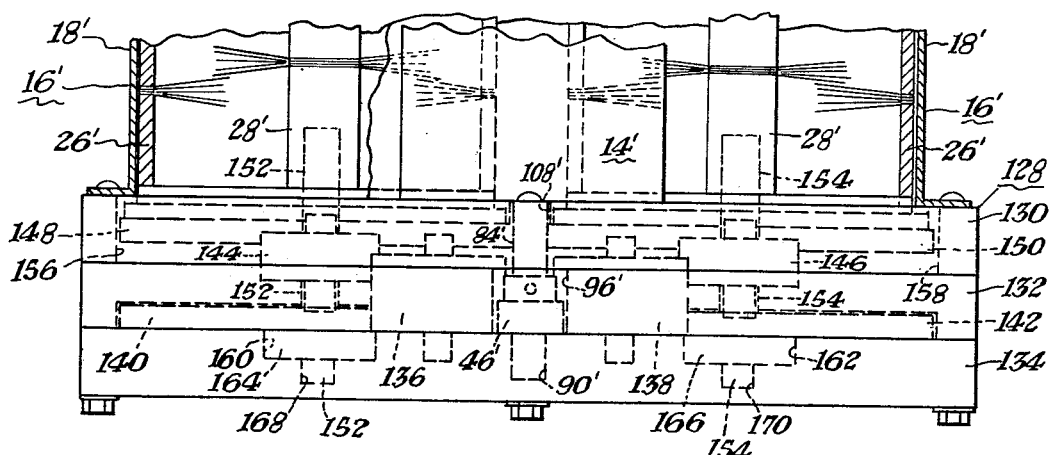
FIGURE 8 is a partial front elevational view, partially sectioned, of another form of washing apparatus arranged in accordance with our invention.

Referring to FIGURES 8 and 9 of the drawings, a double head modification of our novel washing apparatus is shown therein. The washing apparatus 126 in this arrangement likewise can be provided with a base structure 128 formed from top layer 130, middle layer 132 and bottom layer 134. A drive pinion 46' is coupled to output shaft 84' of motor 14'. Pinion 46' drives a pair of wide faced idler gears 136, 138 which in turn rotate a pair of lower output gears 140, 142. Idler gears 136, 138 in turn drive a pair of reversal idler gears 144, 146 respectively, which in turn rotate upper output gear 148, 150 in a direction relatively opposite to lower output gears 140, 142.

A pair of scrubbing heads 16' similar to the scrubbing head shown in FIGURES 1–4 are mounted on the base structure 128. Thus, a pair of drum brushes 26' are mounted respectively on upper output gears 148, 150 for rotation therewith; a pair of cylindrical brushes 28' are mounted respectively on shafts 152, 154 of lower output gear 140, 142; and a continuous shield member 18' is secured to top layer 130 of base structure 128 which is complementarily shaped to accommodate the double scrubbing heads 16' as better shown in FIGURE 9.

Top base layer 130 is provided with a pair of large through apertures 156, 158 to accommodate upper output gears 148, 150 and the lower end portions of said drum brushes 26' mounted thereon. Similarly, upper layer 130 is provided with a through shaft 108'; middle layer 132 is provided with a larger through aperture 96'; and base layer 134 is provided with shaft bearing recess 90'. The aforementioned apertures and recess 108', 96' and 90' accommodate motor output shaft 84' and pinion 46' in the manner described previously in connection with FIGURES 4–7. In the same manner upper surface of bottom layer 134 is provided with a pair of hub wells 160, 162 and shaft bearing recesses 168, 170 to accommodate hubs 164, 166 and ends of shafts 152, 154 of lower output gears 140, 142.

Finally, the three base layers 130–134 are provided with suitably spaced apertures, hub wells and shaft recesses, as the case may be to accommodate the respective parts of idler gears 136, 138 and reversal idler gears 144, 146, as shown in FIGURE 8 of the drawings and in the manner described in connection with FIGURES 4–7 of the drawings with the exception that the numbers of the related aperture, hub wells and shaft recesses described therein are doubled as is the number of the idler gears and reversal idler gears of FIGURE 8.

Referring now to FIGURES 10 and 11 of the drawings, another form of our novel washing apparatus is illustrated exemplarily therein. The latter figures illustrate the complete immersion of washing apparatus 10′ in washing solution container 172. It will be understood that the double head washing apparatus 126 of FIGURES 9 and 10 can be substituted in the arrangement of FIGURES 10 and 11. In the arrangement shown however, washing apparatus 10′ is substantially the same as that shown in FIGURES 1–7 with the exception that fluid motor 174 is mounted on base structure 12′ in place of electric motor 14. Fluid motor 174 is conventional in this construction and is coupled to motor output shaft of apparatus 10′, which as described is similar to shaft 84 shown in FIGURE 4. It is also contemplated that fluid motor 174 whose inlet and outlet connections will be described presently can also be substituted for electric motor 14′ of the washing apparatus 126 of FIGURE 9.

The fluid motor 174 is provided with an inlet conduit 176 which is coupled through a suitable stop valve such as solenoid valve 178 to a cold water tap or other suitable source of drinking water (not shown). Obviously conduit 176 can be coupled to the hot water tap if desired. Pressurized water entering conduit 176 as denoted by flow arrows 180 rotate rotor 182 of fluid motor 174 and exits therefrom by outlet conduit 184 as denoted by flow arrow 186.

The water thus employed to energize the fluid motor 174 can, of course, be discarded. Desirably, however, the outlet water is conducted to one or more rinse tanks such as a pair of rinse tanks 188, 190 as illustrated through branched outlet conduit 192 coupled to conduit 194. Outlet conduit branches 194, 196 desirably are extended downwardly into rinse tanks 188, 190 respectively as shown in FIGURE 11, to extend beneath the surfaces of the rinse water contained therein to avoid splashing. The level of the rinse water in the rinse tanks 188, 190 desirably is maintained constant by a pair of stand pipes or overflow conduits 198, 200 respectively coupled to drain 202.

The washing apparatus 10′ can be operated when desired by manipulating solenoid on-off switch 204. It is contemplated of course that a conventional manually operated valve can be substituted in place of solenoid valve 178 or that inlet conduit 176 can be connected directly to the hot or cold water tap and the spigot (not shown) normally associated therewith can be utilized to control the actuation of fluid motor 174 and washing apparatus 10′ when desired.

We claim:

1. Washington apparatus comprising a free-standing submersible base structure, submersible drive means mounted on the base structure, two driven members rotatably mounted in said base structure in driven relationship with said drive means, one of said two driven members being disposed adjacent a substantially co-extensive opening in an outer surface of said base structure, a scrubbing head including an upstanding hollow cylindrical member having an adjacent portion thereof extending closely through said opening and mounted on said driven member for rotation therewith, said cylindrical member having a top opening shaped to receive an article, and scrubbing means secured to the inner surfaces of said hollow cylindrical member for scrubbing engagement with said article when held within said hollow member, the second of said two driven members being rotatably mounted on said base structure at a location relatively more remote from said scrubbing head than from said one of said driven members, said second of said driven members being in driven relationship with said drive means but otherwise independent of said one of said two driven members, said second of said two driven members having a shaft secured thereto for rotation therewith and extending rotatably through an aperture in said one of said two driven members, submersible bearing means for each of said two driven members, and an inner generally cylindrical brush mounted on said shaft for rotation therewith, said drive means and driven members being contacted with washing solution during submerged, normal operation of said apparatus.

2. Washing apparatus comprising a base structure, drive means mounted on the base structure, at least one driven member rotatably mounted in said base structure in driven relationship with said drive means, said driven member being disposed adjacent a substantially co-extensive opening in an outer surface of said base structure, a scrubbing head including a hollow cylindrical member having an adjacent portion thereof extending closely through said opening and mounted on said driven member for rotation therewith, scrubbing means secured to the inner surfaces of said hollow cylindrical member for scrubbing engagement with an article when held within said hollow member, said scrubbing head being keyingly engaged with said driven member for rotation therewith, and a generally tubular shield mounted on said outer base member surface and circumferentially surrounding said hollow member, said shield having an open co-extensive and registrable with said surface opening to permit insertion and removal of said hollow member.

3. Washing apparatus comprising a base structure, drive means mounted on the base structure, at least one driven member rotatably mounted in said base structure in driven relationship with said drive means, said driven member being disposed adjacent a substantially co-extensive opening in an outer surface of said base structure, a scrubbing head including a hollow cylindrical member having an adjacent portion thereof extending closely through said opening and mounted on said driven member for rotation therewith, scrubbing means secured to the inner surfaces of said cylindrical member for scrubbing engagement with an article when held within said hollow member, said driven member being substantially and relatively closely received within said opening and being provided with a hub at least a portion of which is bearingly and rotatably mounted in a hub well therefor formed in said base structure adjacently and co-axially of said opening.

4. Washing apparatus comprising a base structure, drive means mounted on the base structure, at least one driven member rotatably mounted in said base structure in driven relationship with said drive means, said driven member being disposed adjacent a substantially co-extensive opening in an outer surface of said base structure, a scrubbing head including a hollow cylindrical member having an adjacent portion thereof extending closely through said opening and mounted on said driven member for rotation therewith, scrubbing means secured to the inner surfaces of said hollow cylindrical member for scrubbing engagement with an article when held within said hollow member, a second driven member rotatably mounted on said base structure at a location relatively more remote from said scrubbing head than from said first-mentioned driven member, said second driven member being in driven relationship with said drive means but otherwise independent of said first-mentioned driven means, said second driven member having a shaft secured thereto for rotation therewith and extending rotatably through an aperture in said first-mentioned driven member, an inner generally cylindrical brush mounted on said second driven member shaft for rotation therewith, said second driven member being totally enclosed within a recess formed in said base structure and spaced from said opening, said second driven member having a hub section bearingly and rotatably mounted in a second hub well therefor formed in said base structure and communicating with said recess, said second driven member shaft extending rotatably through an aperture in said base structure communicating with said recess and said opening.

5. The combination according to claim 4, wherein said base structure is formed from a plurality of relatively thick layers one of which includes said surface opening, said opening extends through said one layer, and said recess and said hub wells are positioned respectively in said layers to accommodate said driven members and their hubs, whereby assembly of said base structure and said driven members is facilitate.

6. The combination according to claim 5, wherein said driven members are fabricated from a relatively tough plastic material and said layers are fabricated from a suitable bearing material for immersion and operation of said base layers and said driven members in water.

7. The combination according to claim 5 wherein an output shaft and drive member are extended through and mounted in aperture means respectively in said base layers, and said shaft extends through said drive member for insertion into shaft bearing recesses formed respectively in the outermost ones of said base layers in alignment with said aperture means, said aperture means including an expanded recess in an intermediate one of said layers for accommodating said drive member.

8. The combination according to claim 7 wherein driven members are output gears and said drive member is a pinion, said output gears are drivingly engaged with said drive pinsion respectively through idler and reversal idler gears for rotating said output gears in opposite rotative directions, said idler gears being enclosed in loosely fitted recesses therefor in said base structure layers respectively, and each of said idler gears being mounted on a shaft therefor the ends of which are bearingly and rotatably mounted in bearing recesses formed in said base structure layers substantially co-axially of the associated idler gear recesses.

9. Washing apparatus comprising a base structure, drive means mounted on the base structure, at least one driven member rotatably mounted in said base structure in driven relationship with said drive means, said driven member being disposed adjacent a substantially co-extensive opening in an outer surface of said base structure, a scrubbing head including a hollow cylindrical member having an adjacent portion thereof extending closely through said opening and mounted on said driven member for rotation therewith scrubbing means secured to the inner surfaces of said hollow cylindrical member for scrubbing engagement with an article when held within said hollow member, said drive means being a fluid motor capable of being actuated by tap water pressures, the output water of said fluid motor being conducted through conduit means to at least one rinse tank, said rinse tank being provided with liquid level controlling means for maintaining a constant rinse water level therein when said output water is conveyed thereto by said fluid motor conduit means, and said level controlling means being coupled to a drain conduit.

10. The combination according to claim 9 wherein said output water is conducted through a branched conduit in parallel to at least two series-operated rinse tanks.

11. Washing apparatus comprising a base structure, drive means mounted on the base structure, at least one driven member rotatably mounted in said base structure driven relationship with said drive means, said driven member being disposed adjacent a substantially co-extensive opening in an outer surface of said base structure, a scrubbing head including a hollow cylindrical member having an adjacent portion thereof extending closely through said opening and mounted on said driven member for rotation therewith, scrubbing means secured to the inner surfaces of said hollow cylindrical member for scrubbing engagement with an article when held within said hollow member, said drive means including a submersible electric motor mounted on said base structure generally on about the same elevation as that of said scrubbing head, and submersible bearing means for rotatably mounting said driven member.

References Cited

UNITED STATES PATENTS

| | | | |
|---|---|---|---|
| 872,702 | 12/1907 | Vodoz | 15—76 |
| 914,717 | 3/1909 | Hacker | 15—76 |
| 1,587,213 | 6/1926 | Brown | 15—76 |
| 2,032,916 | 3/1936 | Cunningham | 15—76 |
| 3,315,294 | 4/1967 | Gallo | 15—76 |

FOREIGN PATENTS

| | | |
|---|---|---|
| 2,231 | 5/1881 | Great Britain. |

WALTER A. SCHEEL, Primary Examiner

ROBERT I. SMITH, Assistant Examiner